United States Patent

Meredith et al.

[15] 3,671,608
[45] June 20, 1972

[54] PLASTIC COMPOSITION AND METHOD OF PREPARING SAME

[72] Inventors: Curtis L. Meredith; George A. Von Bodungen, both of Baton Rouge, La.

[73] Assignee: Copolymer Rubber & Chemical Corporation, Baton Rouge, La.

[22] Filed: Nov. 21, 1969

[21] Appl. No.: 878,874

[52] U.S. Cl. .................... 260/878 R, 260/33.6, 260/33.8
[51] Int. Cl. .................................................... C08f 15/04
[58] Field of Search .................................................. 260/878

[56] References Cited

UNITED STATES PATENTS

| | | | |
|---|---|---|---|
| 3,151,173 | 9/1964 | Nyce | 260/666 |
| 3,271,477 | 9/1966 | Kresge | 260/878 |
| 3,311,675 | 6/1967 | Doak et al. | 260/880 |
| 3,344,105 | 9/1967 | McDonel et al. | 260/878 |
| 3,432,577 | 3/1969 | Serniuk | 260/879 |
| 3,435,096 | 3/1969 | Limbert et al. | 260/878 |
| 3,449,471 | 6/1969 | Weitzel et al. | 260/880 |
| 3,483,273 | 12/1969 | Prucnal et al. | 260/878 |
| 3,489,821 | 1/1970 | Witt et al. | 260/878 |
| 3,538,191 | 11/1970 | Meredith et al. | 260/878 |

*Primary Examiner*—Harry Wong, Jr.
*Attorney*—McDougall, Hersh & Scott

[57] ABSTRACT

An improved plastic composition formed by the reaction of an alkenyl aromatic monomer, an acrylic monomer and an interpolymer of ethylene, at least one other straight chain alpha-monoolefin and a compound selected from the group consisting of aliphatic and cycloaliphatic polyene compounds in the presence of a free radical catalyst in an organic solvent, and in the presence of a seed mixture comprising a mixture of said monomers and said interpolymer which has been reacted to at least 15 percent conversion based on said monomers.

28 Claims, No Drawings

PLASTIC COMPOSITION AND METHOD OF PREPARING SAME

This invention relates to the preparation of plastic compositions, and more particularly to EPDM rubber-modified plastic compositions having improved properties.

A variety of high-impact or gum plastics, which are generally referred to in the art as "rubber-modified plastics," and methods for their preparation have been proposed. However, many of the plastics prepared by the prior art processes have failed to achieve optimum properties in all respects including impact resistance, tensile strength and hardness.

Substantial improvements in preparing rubber-modified plastic have been made by a simple one-step process disclosed in copending application, Ser. No. 626,930, filed Mar. 30, 1967, now U.S. Pat. No. 3,538,191 and entitled "A Process for Preparing Rubbery Plastic Compositions and the Resultant Products" wherein description is made of a process for preparing rubber-modified styrene-acrylic grafted terpolymers by interpolymerizing a rubbery polymer, an alkenyl aromatic monomer, such as styrene, and a acrylic monomer in the presence of an organic solvent. Rubber-modified plastics prepared by this process have been found to possess a variety of improved physical properties, such as improved impact resistance, as compared to rubber-modified plastics heretofore known.

It is an object of this invention to provide and to produce rubber-modified plastics having further improved properties, and it is a related object of the present invention to prepare improved EPDM rubber-modified plastics.

It is another object of the present invention to provide a new and improved polymerization process for preparing EPDM rubber-modified plastics wherein such plastics may be prepared in a simple economical step by the simultaneous grafting of an EPDM rubbery polymer with a resinous copolymer.

Other objects and advantages of the invention will appear hereinafter, and it will be understood that the specific examples appearing hereinafter are provided by way of illustration and not by way of limitation.

The concepts of the present invention reside in a copolymer resin of an alkenyl aromatic monomer and an acrylic monomer which is grafted to an EPDM terpolymer to form an EPDM rubber-modified plastic and method for its preparation, wherein the alkenyl aromatic monomer, the acrylic monomer and the EPDM terpolymer are interpolymerized in an organic solvent in the presence of a free radical catalyst and in the presence of a partially reacted seed mixture comprising the acrylic monomer, the alkenyl aromatic monomer and the terpolymer which has been reacted to at least 15 percent conversion based upon the monomers, and preferably to a conversion within the range of 20 to 60 percent.

It has been found that EPDM rubber-modified plastics prepared in accordance with the present invention have superior mechanical properties, such as impact resistance and melt flow properties, as compared to plastic compositions prepared by the interpolymerization of the monomer and terpolymer in the absence of a seed mixture. The process of the present invention permits a heretofore unknown flexibility in preparing plastic compositions having optimum impact resistance and melt flow properties without the sacrifice of efficiency or simplicity.

According to the preferred embodiment of the invention, the process is carried out as a batch process wherein a portion of the recipe for a batch is placed in a suitable reactor and is reacted to at least 15 percent conversion based upon the monomers present, after which the balance of the recipe is added to the reaction vessel and the reaction carried to completion. Thus, in this embodiment, the initial portion of the recipe which is partially reacted serves as the seed mixture for the overall reaction. However, the process of the present invention can also be advantageously carried out in a continuous manner in accordance with another embodiment of the invention. In a continuous process, a portion of the reaction mixture is allowed to remain in the first reactor in an intermediate stage of conversion to provide a seed mixture for the fresh feed.

The amount of the seed mixture present in the reaction mixture is not critical. However, it is generally preferred that the seed mixture constitute between 15 and 75 percent by weight of the reaction mixture, and preferably between 20 and 60 percent by weight.

The initial composition of the mixture which is reacted to form the seed mixture, prior to reaction, is preferably substantially the same as the composition of the fresh feed with which the partially reacted seed mixture is admixed. It has been found that best results are obtained when the ratio by weight between the alkenyl aromatic monomer and the acrylic monomer is at least 0.2–5 to 1, and is preferably in the range of 1–4 to 1. In the preferred embodiment where the alkenyl aromatic monomer and the acrylic monomer are styrene and acrylonitrile, respectively, the rubber-modified plastics of the invention achieve optimum properties when the weight ratio between styrene and acrylonitrile is within the range of 72:38 to 78:22, or about 3:1.

The reaction mixture to be polymerized should contain about 1–50 parts by weight, and preferably 4–25 parts by weight, of the rubbery polymer for each 99–50 parts by weight, and preferably 96–75 parts by weight, of the alkenyl aromatic monomer and the acrylic monomer. It will be appreciated that the alkenyl aromatic monomer and the acrylic monomer may be one or a mixture of more than one alkenyl aromatic monomer and/or acrylic monomer respectively. The reaction mixture also contains the free radical catalyst, preferably in an amount in the range of 0.25 to 2.5 parts by weight, and more preferably 0.5 to 1.3 parts by weight of the free radical catalyst or initiator for each 100 parts by weight of alkenyl aromatic monomers and acrylic monomers. Additionally, better results are frequently attained when the organic solvent content of the reaction mixture is varied between 50 percent by weight of the total weight of the reaction mixture at the lower limit of the EPDM terpolymer content mentioned above and 90 percent by weight thereof when the upper EPDM terpolymer range mentioned above is used. When the preferred range of the rubbery polymer is used, i.e., 4–25 percent by weight, then the solvent should be present in an amount constituting 85–60 percent by weight of the total reaction mixture.

The alkenyl aromatic monomers which may be used in the preparation of improved rubber-modified plastics according to the present invention includes alkenyl aromatic hydrocarbons containing eight to 20 carbon atoms, and their halogenated derivatives. Specific examples of such monomers include styrene, chlorostyrene, alpha-alkyl styrene wherein the alkyl group contains one to eight carbon atoms, such as alpha-methylstyrene, alpha-chlorostyrene, vinyl naphthalene, alkyl-substituted vinyl naphthalene wherein the alkyl group or groups contain one to eight carbon atoms, and halogen-substituted vinyl naphthalene. Styrene is generally the preferred alkenyl aromatic monomer.

The acrylic monomer which may be used in the present invention are those monomers having a general formula:

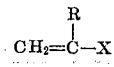

wherein R is selected from a group consisting of hydrogen and alkyl having one to five carbon atoms, and X is selected from a group consisting of:

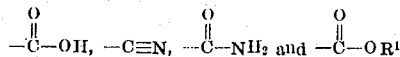

wherein $R^1$ is alkyl having one to nine carbon atoms. Examples of such monomers which have been found to be of particular use include acrylonitrile, acrylamide, methylene or ethylene acryonitrile, acrylic, methacrylic, and ethyl-acrylic acid and the methyl, ethyl, propyl and isopropyl esters thereof. Acrylonitrile is generally the preferred acrylic monomer.

The EPDM terpolymers useful in the present invention are generally those elastomers prepared by the reaction of ethylene, at least one other straight chain alpha-monoolefin having three to 16 carbon atoms, such as propylene, isobutylene, etc., and an aliphatic or cycloaliphatic polyene monomer having four to 20 carbon atoms.

The polyene monomers can be conjugated dienes such as 1,3-butadiene, isoprene, chloroprene, 1,4-hexadiene, as well as a variety of other conjugated polyenes, but are preferably non-conjugated aliphatic and cycloaliphatic dienes, such as non-conjugated hexadiene, octadiene, etc. Terpolymers prepared from the foregoing generally have relatively low unsaturation and their preparation is known to those skilled in the art.

The preferred EPDM elastomers having relatively low unsaturation are those prepared by the interpolymerization of a monomeric mixture containing 10–90 mole percent ethylene and 10–90 mole percent of at least one other straight chain alpha-monoolefin containing three to 16 carbon atoms and preferably propylene, and from 0.1 to 10 mole percent of an unsaturated bridged-ring hydrocarbon having at least one carbon-to-carbon double bond in a bridged ring in a solution of hexane or other organic solvent, and in the presence of a catalyst prepared from vanadium oxytrichloride and methyl or ethyl aluminum sesquichloride or other suitable Ziegler catalyst. The preparation of such EPDM terpolymers is disclosed in U.S. Pat. Nos. 2,933,480, 3,093,620, 3,093,621, 3,211,709, 3,113,115 and 3,300,450, the teachings of which are incorporated herein by reference.

It is preferred that the elastomers having low unsaturation be prepared from a monomeric mixture containing ethylene, propylene and the polyunsaturated bridged-ring hydrocarbon, in proportions to produce a polymer having good elastomeric properties and an unsaturation level of at least two carbon-to-carbon double bonds per thousand carbon atoms in the polymer. For example, the elastomer may contain chemically bound therein molar ratios of ethylene to propylene varying between 80:20 and 20:80, and between 70:30 and 55:45 for better results. The bridged-ring hydrocarbon may be chemically bound therein in an amount to provide an unsaturation level of 2–25, and preferably about three to 16 carbon-to-carbon double bonds per thousand carbon atoms in the polymer.

Examples of the bridged-ring hydrocarbons include the polyunsaturated derivatives of bicyclo-(2,2,1)-heptane wherein at least one double bond is present in one of the bridged rings, such as dicyclopentadiene, bicyclo(2,2,1) hepta-2,5-diene, the alkylidene norbornenes, and especially the 5-alkylidene-2-norbornenes wherein the alkylidene group contains one to 20 carbon atoms and preferably one to eight carbon atoms, the alkenyl norbornenes, and especially the 5-alkenyl-2-norbornenes wherein the alkenyl group contains about three to 20 carbon atoms and preferably three to 10 carbon atoms. Other bridged-ring hydrocarbons include polyunsaturated derivatives of bicyclo-(2,2,2)-octane as represented by bicyclo (2,2,2) octa-2,5-diene, polyunsaturated derivatives of bicyclo (3,2,1)-octane, polyunsaturated derivatives of bicyclo(3,3,1)-nonane, and polyunsaturated derivatives of bicyclo-(3,2,2)-nonane. At least one double bond is present in a bridged ring of the above compounds, and at least one other double bond is present in a bridged ring or in a side chain. Specific examples of bridged-ring compounds include 5-methylene-2-norbornene, 5-ethylidene-2-norbornene, 5-isopropylidene-2-norbornene, dicyclopentadiene, the methyl butenyl norbornenes such as 5-(2-methyl-2-butenyl)-2-norbornene, or 5-(3-methyl-2-butenyl)-2-norbornene and 5-(3,5-dimethyl-4-hexenyl)-2-norbornene. The elastomers prepared from ethylene, at least one monoolefin containing three to 16 carbon atoms, and the 5-alkylidene-2-norbornenes, wherein the alkylidene group contains one to 20 and preferably one to eight carbon atoms, produce novel rubber-modified plastics which have exceptional properties. The elastomer prepared from 5-ethylidene-2-norbornene is much preferred as it has outstanding properties and produces many unusual and unexpected results when used as the elastomer in the plastic compositions of the invention. As a result, this elastomer is in a class by itself.

In instances where an elastomer is employed which has no unsaturation or very little unsaturation, then it is often desirable to prepare a hydroperoxide thereof by oxidation prior to the polymerization step of the present invention. The oxidation may be in accordance with prior art practice, such as by heating a solution of the elastomer in the presence of molecular oxygen and an organic peroxide or hydroperoxide as a catalyst. In one suitable method, the elastomer is dissolved in a mixture of benzene and hexane, and benzoyl peroxide is added as a catalyst for the oxidation. The reaction vessel is pressurized to 50 psi with oxygen and maintained at 70° C. for 0.5 to 8 hours. Oxidation can also be affected without a free radical catalyst by reacting for 2 to 10 hours. The resin monomers are added to the solution of the oxidized rubber, with or without adding an additional free radical catalyst, and polymerized to form a rubber-modified plastic according to the present invention. The hydroperoxide groups may alone act as the free radical catalyst for the monomer polymerization. It is understood that the elastomer may be oxidized to form hydroperoxide groups thereon whenever there is difficulty in reacting the elastomer substrate with the graft monomers in the desired amounts to thereby achieve greater ease of grafting.

A wide variety of free radical polymerization catalysts may be employed, including those used in the prior art processes for preparing high impact polystyrene and styrene-acrylonitrile plastics. In some instances, the hydroperoxide groups that are formed by oxidation of the rubbery component may act as the free radical catalyst. Examples of free radical polymerization catalysts include the organic peroxides such as benzoyl peroxide, lauroyl peroxide, propionyl peroxide, 2,4-dichlorobenzoyl peroxide, acetyl peroxide, tertiary butyl hydroperoxide, tertiary butyl perbenzoate, tertiary butyl peroxyisobutyrate, and dicumylperoxide. Mixtures of one or more peroxides may be employed. Additionally, mixtures of one or more peroxides with azo-bisdiisobutyronitrile give better results in some instances, and especially where a less active catalyst is effective. For example, when using the highly unsaturated diene rubbers, or rubbers of low or high unsaturation that have been subjected to an oxidation step to form hydroperoxide groups thereon, then a less active free radical catalyst should be used for optimum results. The catalyst mixture may contain 25–75 percent and preferably about 50 percent by weight of the azo-bisdiisobutyronitrile, and 75–25 percent, and preferably about 50 percent by weight, of one or more of the above organic peroxides. In instances where an unoxidized elastomer is used having a low degree of unsaturation, then it is desirable to employ a highly active free radical initiator, e.g., a prior art initiator which is known to abstract hydrogen from the elastomer and rapidly catalyze the graft reaction. Many examples of such highly active free radical initiators are known, such as benzoyl peroxide.

The organic solvent that is selected must be a solvent for the rubbery polymer. Examples of suitable solvents include aromatic hydrocarbons such as benzene, benzene substituted with one or more alkyl groups containing two to four carbon atoms such as toluene, dimethylbenzene, xylene and their higher homologs, naphthalene, naphthalene substituted with one or more alkyl groups containing one to four carbon atoms such as alpha-methyl or beta-methyl naphthalene and their higher homologs, paraffin and cycloparaffin hydrocarbons containing five to 15 carbon atoms, and preferably six to 10 carbon atoms, such as pentane, n-hexane, 3-methylpentane, 2-methylpentane, 2,2- and 2,4-dimethylpentane, heptane, cyclopentane, cyclohexane, and alkyl substituted cyclopentanes and cyclohexanes wherein the alkyl group or groups contain one to four carbon atoms, including methyl cyclopentane, methyl cyclohexane and their homologs. The halogenated derivatives of the above solvents may be employed, and especially the chlorine and bromine derivatives. Chlorobenzene is very useful as a solvent.

Mixtures containing two or more of the foregoing solvents may be used, and are preferred in many instances. Examples of solvent mixtures which give unusually good results include an aromatic component such as benzene and/or toluene, and a paraffin or cycloparaffin hydrocarbon component containing six through eight carbon atoms such as n-hexane, 3-methylpentane, 2-methylpentane, n-heptane, methyl hexanes, n-octane, methyl octanes methylcyclopentane, and/or cyclohexane.

Usually better results are obtained when the above solvent mixtures contain about 40–60 percent by weight of the aromatic solvent component, and about 60–40 percent by weight of the paraffin or cycloparaffin hydrocarbon component. Best results are usually obtained when about 50% by weight of each component is present.

It will be understood by those skilled in the art that in the practice of the present invention there is a tendency for the final conversion to be somewhat lower than that of a batch process because of the dilution of the partially reacted seed mixture with fresh unreacted feed, particularly in those instances where the seed mixture constitutes greater than 50 percent by weight of the reaction mixture. This reduction in conversion can be advantageously compensated for by the incremental addition of a non-aromatic or aliphatic solvent to the reaction mixture after the reaction is commenced. The non-aromatic solvents found most suitable for this purpose are the paraffin and cycloparaffin solvents disclosed above, with the most preferred solvent being hexane.

Without limiting the invention as to theory, it is believed that non-aromatic solvents, such as hexane, are poorer solvents for the graft terpolymer product formed by the process of the invention, and thus there is a tendency for the product to precipitate out of the reaction mixture as it is formed, thereby driving the reaction further toward 100 percent conversion. The use of this technique in the process of the invention has further advantages in that there are less of the unreacted monomers to be separated from the final product, and the coagulation proceeds more smoothly to provide a product in the form of a fine powder.

The amount of the solvent added to the reaction mixture is not critical, and is preferably an amount up to 50 percent by weight of the total amount of solvent present in the reaction mixture prior to the addition of the non-aromatic solvent. When a non-aromatic solvent is added incrementally to the reaction mixture in accordance with this concept, the total amount of the solvent and the relative proportions of the aromatic and non-aromatic solvents, when a mixture of such solvents is used, initially present in the reaction mixture prior to the addition of the non-aromatic solvent remain essetially unchanged from the amounts disclosed above. It will be appreciated that the aliphatic solvent may be added in one or more increments.

The time of making the addition or additions depends primarily upon the reaction temperature, and generally falls between one-seventh and six-seventh of the total reaction time required to achieve at least 90 percent conversion. At higher reaction temperatures, it is generally desirable that the addition be made later during the course of reaction, and multiple additions are of 10 preferred at such temperatures, including as many as 5 incremental additions during the course of the reaction.

The temperature of the polymerization reaction may vary over wide ranges. For example, reaction temperatures within the range of about 40°–150° C., and preferably within the range of about 60°–85° C. are generally satisfactory. It has been found that lower temperatures within these ranges generally result in rubber-modified plastics having increased impact resistance, whereas higher temperatures within the disclosed ranges generally result in a product having increased melt flow properties. In order to achieve optimum impact and melt flow properties in the product, it is particularly preferred to operate within the narrow range of 70°–80° C. In general, use is made of a reaction temperature such that the free radical initiator should have a half life of 4–15 hours. The reaction is continued for a sufficient period of time to insure the desired percent conversion of the monomers present in the reaction mixture. The reaction time will vary somewhat with the specific catalyst, solvent system, rubbery polymer, monomers and reaction temperature which are employed. However, reaction temperatures within the range of 4–24 hours are generally satisfactory. In any event, the reaction is preferably continued until at least 60 percent by weight of the monomeric material present in the reaction mixture has been converted to polymer, and preferably until a conversion within the range of 90–95 percent by weight is reached.

The reaction mixture also may contain a cross-linking agent, i.e., a compound containing at least two reactive sites such as two or more ethylenic double bonds. Examples of cross-linking agents are divinylbenzene, divinyl ether of diethylene glycol, triallylcyanurate, and 1,3-butylenedimethacrylate. The cross-linking agent may be added in an amount of, for example, 0.005–1.0 parts by weight, and preferably about 0.01 to 0.5 parts by weight, per 100 parts by weight of the monomeric material to be polymerized. Still other types of cross-linking agents may be employed as it is only necessary that it have two or more reactive sites under the conditions of the polymerization.

The reaction mixture may be agitated during the polymerization but vigorous agitation is not necessary. As the polymerization proceeds, the resinous polymer that is formed generally precipitates in a finely dispersed form and remains suspended in the reaction mixture. The EPDM terpolymer generally remains dissolved in the solution after it has been grafted with the resin-forming monomers. Thus, the polymerization reaction simultaneously produces a resinous terpolymer of the alkenyl aromatic and acrylic monomers and the EPDM terpolymers grafted with the resin-forming alkenyl aromatic and acrylic monomers. As a result, at the end of the polymerization the reaction mixture contains all the components which are needed for a high impact plastic composition, and it is only necessary to recover the products of the polymerization therefrom.

The plastic composition may be recovered from the reaction mixture by coagulation with a lower aldohol such as methyl, ethyl or isopropyl alcohol, or by flashing off the solvent. When the product is recovered by flashing the solvent, preferably the reaction mixture is passed into a vessel containing boiling water. Steam is supplied to the vessel and the solvent evaporates and is removed overhead as a vapor, together with any free monomer content. The plastic product is recovered as a solid in particulate form, and it may be dewatered, washed in water to remove water-soluble impurities, and air dried or, preferably dried at an elevated temperature, such as at a temperature within the range of 50°–150° C. until the water content is removed. Fluidized bed drying at 50°–150° C. also may be used in most instances with good results. The dried plastic composition may be pelletized or formed into other desirable shapes suitable for marketing.

Prior art antioxidants, processing aids, and other compounding ingredients and aids may be added at any convenient point in the process. Inasmuch as these ingredients are soluble or dispersible in the organic solvent, they may be added to the polymerization mixture prior to recovery of the product. Examples of suitable antioxidants include phosphited polyalkyl polyphenols and tri(mixed mononyl-dinonyl) phenyl phosphite. Examples of processing aids are mineral oils and the salts and esters of higher fatty acids. When desired, coloring agents may be added to produce colored resins. The coloring pigments of the prior art are suitable for this purpose.

The high impact plastic compositions prepared by the process of the present invention have superior physical properties, and particularly superior impact resistance, as compared to similar products prepared from EPDM terpolymers which have not been, prior to polymerization, oil-extended. Additionally, by using the preferred EPDM terpolymers having low unsaturation, particularly the terpolymers of ethylene, propylene and 5-alkylidene-2-norbornene, even better physical properties may be obtained. The novel plastic composition of the present invention comprises (A) a resinous copolymer of an alkenyl aromatic monomer and an acrylic monomer and (B) a graft interpolymer (1) an elastomeric interpolymer of ethylene, at least one other alpha-monoolefin and an aliphatic or cycloaliphatic polyene, (2) an alkenyl aromatic monomer and (3) an acrylic monomer.

As indicated, the preferred polyenes are the 5-alkylidene-2-norbornenes, wherein the alkylidene group contains one to eight carbon atoms, with the preferred species being 5-ethylidene-2-norbornene.

Reference is now made to the following examples which are illustrative of the principal concepts of the present invention.

EXAMPLE 1

This example illustrates the unexpected improvements in the properties of EPDM rubber-modified plastics prepared in accordance with the concepts of the present invention.

The EPDM terpolymer used in this example is an interpolymer of ethylene, propylene and 5-ethylidene-2-norbornene, which contains approximately equal weights of ethylene and propylene and sufficient 5-ethylidene-2-norbornene to provide an unsaturation level of 8.7 carbon-to-carbon double bonds per 1,000 carbon atoms and which has a Mooney value of 66 (ML–4).

A recipe is prepared from the above terpolymer, styrene and acrylonitrile which has the following composition:

| | |
|---|---|
| Solvent (benzene and hexane in equal parts by weight) | 1400 Parts by Weight |
| Styrene | 450 Parts by Weight |
| Acrylonitrile | 150 Parts by Weight |
| EPDM | 82 Parts by Weight |
| Benzoyl peroxide | 6 Parts by Weight |

In Run 1, the entire recipe is charged to a reactor equipped with a stirrer which is heated to and maintained at a temperature of 70° C. The reaction is carried out with agitation to final conversion (90 to 99 percent based upon the styrene and acrylonitrile monomers) without interruption. The total time for reaction is 12 hours, after which the resulting product is precipitated from the reaction mixture by the addition of alcohol. The solid plastic polymer is then dewatered, washed in water to remove water-soluble impurities, died and tested for Izod impact resistance and to determine the melt flow index in g./10 minutes. The results of these tests are shown in Table I.

In Run 2, 50 percent by weight of the recipe is charged to the reactor used in Run 1 which is maintained at 78° C., and is reacted to 20 percent conversion. Thereafter, the reaction is interrupted and the remaining 50 percent by the recipe is added to the reactor, and the entire mixture is reacted to final conversion (90 to 99 percent). The product is tested for impact resistance and melt flow properties, the results of which are shown in Table I.

The procedure shown in Run 2 is employed in Runs 3, 4, 5 and 6, except that the amount of the recipe added to the seed mixture and the conversion of the seed mixture of the time the balance of the recipe is added are as shown in Table I.

TABLE I

| Run | Amount of recipe added to seed mixture (percent) | Conversion of seed at time of addition (percent) | Temp. °C. | Izod impact | Run time | Melt flow index |
|---|---|---|---|---|---|---|
| 1 | 0 | | 70 | 3.7 | 12 | 0.40 |
| 2 | 50 | 20 | 78 | 4.8 | 7 | 1.14 |
| 3 | 50 | 40 | 72 | 6.3 | 10 | 0.75 |
| 4 | 50 | 60 | 76 | 5.1 | 8 | 1.19 |
| 5 | 25 | 25 | 72 | 3.3 | 10 | 0.37 |
| 6 | 30 | 100 | 80 | 2.8 | | 0.55 |

It will be apparent from the foregoing that the concepts of the present invention provide a plastic composition which has superior impact resistance and melt flow index. Thus, in Run 1 where the entire batch was reacted to final conversion without interruption, the impact resistance and melt flow index of the polymers produced was lower than that for polymers produced wherein the reaction mixture contained less than 75 percent by weight of the seed mixture. Run 2 illustrates that better flow properties are achieved in polymers prepared at higher temperatures within the disclosed ranges, whereas Run 3 demonstrates that improved impact resistance is achieved by polymerization at lower temperatures.

EXAMPLE 2

The terpolymer used in Example 1 is dissolved in a mixture of equal parts by weight hexane and benzene, and styrene, acrylonitrile and catalyst are added to form the following composition.

| | Parts by weight |
|---|---|
| Solvent | 1400 |
| Styrene | 450 |
| Acrylonitrile | 150 |
| EPDM terpolymer | 115 |
| Benzoyl peroxide | 6 |

In Run 7, an entire batch having the foregoing composition is reacted to final conversion without interruption at 70° C. using the same reaction vessel described in Example 1. The results of tests conducted on the resulting product are shown in Table II.

In Run 8, 50 percent by weight of a reaction mixture having the above composition is reacted to 40% conversion based upon the styrene present at 75° C., after which the remaining 50 percent of the recipe is added. The entire mixture is reacted to final conversion at 75° C. The properties of the product are shown in Table II.

TABLE II

| Run | Amount of recipe added to seed mixture | Conversion of seed at time of addition | Temp. C. | Izod Impact | Melt Flow Index |
|---|---|---|---|---|---|
| 7 | 0 | — | 70° | 9.5 | 0.45 |
| 8 | 50% | 40% | 75° | 9.6 | 1.61 |

The foregoing likewise demonstrates the flexibility of the method of the present invention in that it shows that at higher temperatures within the preferred range, a plastic composition is produced which has a significantly greater melt flow index without a large change in the impact strength.

EXAMPLE 3

The terpolymer used in Examples 1 and 2 is dissolved in a solvent comprising equal weights of toluene and hexane, and the resulting solution is mixed with alpha-methyl styrene, acrylic acid and a catalyst.

50 percent by the mixture is charged to a Sutherland Reactor equipped with a stirrer, and is carried to 35 percent conversion based upon the alpha-methyl styrene present. Thereafter, the remaining 50 percent of the batch is added to the reactor, and the entire mixture is carried to final conversion at a temperature of 75° C.

The product is spearated in the manner shown in Example 1, and is found to have an Izod impact strength of 4.91 ft.-lb/in.-notch and a melt flow of 0.89 g/10 minutes.

EXAMPLE 4

In this example the EPDM terpolymer is an interpolymer of ethylene, propylene and dicyclopentadiene having an ethylene-propylene weight ratio of 58:42 and containing 3 percent by weight dicyclopentadiene.

The terpolymer is dissolved in a hexane-benzene solvent mixture and mixed with alpha-chlorostyrene and methyl acrylate and dicumyl peroxide catalyst. 60 percent of the batch is reacted for 5 hours to achieve 45 percent conversion based upon the alpha-chlorostyrene, at which time the remaining portion of the batch is added.

The product separated at final conversion of the entire mixture is found to possess improved impact resistance and melt flow properties.

EXAMPLE 5

This example illustrates the concepts of present invention as applied to a continuous process. The terpolymer of Example 1 is formulated into a composition of the following materials.

|  | Parts by Weight |
| --- | --- |
| Benzene | 780 |
| Hexane | 780 |
| EPDM terpolymer | 108 |
| Styrene | 622 |
| Acrylonitrile | 166 |
| Benzoyl peroxide | 7.88 |

The reaction mixture is continuously fed to a reaction system comprising three reaction vessels of the type used in Example 1 which are connected in series at a rate of 25.0 ml/mi. Reactors 1 and 3 are maintained at 74° C. while reactor 2 is maintained at 70° C.

Since only a portion of the reaction medium is continuously being displaced from the first reactor to the next, material remains in the first reactor in intermediate conversion to provide the seed for the ingredients fed into the first reactor to achieve a steady state. The reaction mixture in reactor 3 is continuously carried to final conversion, resulting in a product having a melt flow of 0.52 g/10 min. and an Izod impact of 4.97 ft.-lb/in.-notch.

EXAMPLE 6

This example illustrates the concept of the present invention wherein an aliphatic solvent is added to a reaction mixture containing a solvent mixture of an aromatic solvent and an aliphatic solvent.

A batch comprising the terpolymer of Example 1, styrene, acrylonitrile and catalyst is prepared in a benzene-hexane solvent mixture having the following composition:

| Benzene | 770 g. |
| --- | --- |
| Hexane | 630 g. |
| Styrene | 450 g. |
| EPDM terpolymer | 82 g. |
| Acrylonitrile | 150 g. |
| Benzoyl peroxide | 6 g. |

50 percent by weight of the above composition is charged to a reaction vessel equipped with a stirrer, and reacted to 20 percent conversion. Thereafter, the remaining 50 percent of the batch is added to the reactor and the entire reaction mixture is reacted at 75° C. for a period of 2.5 hours, after which 310 g. of hexane are added in one increment and the final mixture is carried to final conversion.

The initial benzene-hexane weight ratio is 55/45, and the final ratio is 45/55. The product is found to have an Izod impact of 5.20 ft.-lb/in.-notch and a melt flow index of 1.21 g/10 min.

EXAMPLE 7

The composition and procedure of Example 6 is employed in this example, except that the hexane is added in one increment after the reaction has proceeded for 6 hours at 75° C.

The resulting product is found to have an Izod impact strength of 5.67 ft.-lb./in.-notch and a melt flow index of 0.40.

EXAMPLE 8

The terpolymer used in this example is a terpolymer of approximately equal parts by weight of ethylene and propylene and sufficient 1,4-hexadiene to provide a rubbery terpolymer containing three carbon-to-carbon double bonds per 1,000 carbon atoms.

The terpolymer is dissolved in a solvent comprising equal weights of toluene and hexane, and the resulting solution is admixed with alpha-methyl styrene, acrylonitrile and a catalyst.

55 percent of the reaction mixture is charged to a reaction vessel equipped with a stirrer, and is carried to about 40 percent conversion based upon the monomers present. Thereafter, the remaining 40 percent of the reaction batch is added to the vessel, and the entire mixture is carried to final conversion of 92 percent at a temperature of 77° C.

The rubber-modified plastic product is separated from the reaction mixture, and is found to have improved impact resistance and melt flow properties.

It will be apparent from the foregoing that we have provided a new and improved process for preparing rubber-modified plastics having further improved properties as compared to those rubber-modified plastics heretofore known. The process of the present invention permits a great deal of flexibility in preparing plastic compositions having the foregoing improved properties without the sacrifice of efficiency and economy.

It will be understood that various changes may be made in the details of formulation and operation without departing from the spirit of the invention, especially as defined in the following claims.

We claim:

1. A plastic composition formed by the reaction of 99 to 50 parts by weight of an alkenyl aromatic monomer and an acrylic monomer having the formula

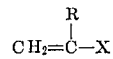

wherein R is selected from the group consisting of hydrogen and $C_1$ to $C_5$ alkyl and X is selected from the group consisting of

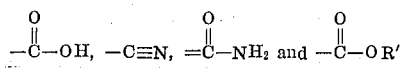

wherein R' is $C_1$ to $C_9$ alkyl wherein the weight ratio between the alkenyl aromatic monomer and the acrylic monomer is within the range of 0.2 to 5, and 1 to 50 parts by weight of an elastomeric interpolymer of ethylene, at least one straight chain alpha-monoolefin containing three to 16 carbon atoms and a compound selected from the group consisting of aliphatic and cycloaliphatic polyenes in the presence of a free radical catalyst in an inert organic solvent selected from the group consisting of aromatic hydrocarbons, their alkyl- and halogen-substituted derivatives, aliphatic hydrocarbons and their halogen-substituted derivatives and mixtures thereof, and in the presence of 15–75 percent by weight of a seed mixture consisting essentially of said monomers and said interpolymer which have been reacted to 15–75 percent conversion based on said monomers.

2. A composition as defined in claim 1 wherein said seed mixture has been reacted to a conversion within the range of 20–60 percent based on said monomers.

3. A composition as defined in claim 1 wherein said alkenyl aromatic monomer and said acrylic monomer are present in a weight ratio in the range of 1–4 to 1.

4. A composition as defined in claim 1 wherein said alkenyl aromatic monomer is styrene and said acrylic monomer acrylonitrile.

5. A composition as defined in claim 1 wherein the weight ratio between the styrene and the acrylonitrile is within the range of 72:28 to 78:22.

6. A composition as defined in claim 1 wherein said alpha-monoolefin is propylene.

7. A composition as defined in claim 1 wherein said polyene compound is a polyunsaturated bridged-ring hydrocarbon having at least one carbon-to-carbon in a bridged ring.

8. A composition as defined in claim 1 wherein said polyene compound is a polyunsaturated derivative of a compound selected from the group consisting of bicyclo-(2,2,1)-heptane, bicyclo-(2,2,2)-octane, bicyclo-(3,2,1)-octane, bicyclo-(3,3,1)-nonane and bicyclo(3,2,2)-nonane.

9. A composition as defined in claim 1 wherein said polyene compound is a 5-alkylidene-2-norbornene.

10. A composition as defined in claim 1 wherein said elastomeric terpolymer is a terpolymer of ethylene, propylene and 5-ethylidene-2-norbornene.

11. A composition as defined in claim 1 wherein said seed mixture constitutes from 20–60 percent by weight of the reaction mixture.

12. In a process for preparing improved plastic compositions wherein 99 to 50 parts by weight of an alkenyl aromatic monomer and an acrylic monomer having the formula

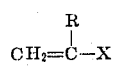

wherein R is selected from the group consisting of hydrogen and $C_1$ to $C_5$ alkyl and X is selected from the group consisting of

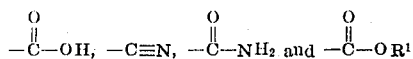

wherein R' is $C_1$ to $C_9$ alkyl wherein the weight ratio between the alkenyl aromatic monomer and the acrylic monomer is within the range of 0.2 to 5, and 1 to 50 parts by weight of an elastomeric interpolymer of ethylene, at least one straight chain alpha-monoolefin containing three to 16 carbon atoms and a compound selected from the group consisting of aliphatic and cycloaliphatic polyenes are reacted in an inert organic solvent selected from the group consisting of aromatic hydrocarbons, their alkyl- and halogen-substituted derivatives, aliphatic hydrocarbons and their halogen-substituted derivatives and mixtures thereof in the presence of a free radical catalyst, the improvement comprising reacting said monomers and said interpolymer in the presence of 15–75 percent by weight of a seed mixture comprising a mixture of said monomers and said interpolymer which has been reacted to 15–75 percent conversion based upon said monomers.

13. A process as defined in claim 12 wherein said seed mixture has been reacted to a conversion within the range of 20–60 percent based upon said monomers.

14. A process as defined in claim 12 wherein said seed mixture constitutes from 15–75 percent by weight of the reaction mixture.

15. A process as defined in claim 12 wherein said seed mixture constitutes from 20–60 percent by weight of the reaction mixture.

16. A process as defined in claim 12 wherein said alpha-monoolefin is propylene.

17. A process as defined in claim 12 wherein said polyene compound is a polyunsaturated bridged-ring compound having at least one carbon-to-carbon in a bridged ring.

18. A process as defined in claim 12 wherein said polyene coumpound is a polyunsaturated derivative of a compound selected from the group consisting of bicyclo-(2,2,1)-heptane, bicyclo-(2,2,2)-octane, bicyclo-(3,2,1)-octane, bicyclo-(3,3,1)-nonane and bicyclo(3,2,2)-nonane.

19. A process as defined in claim 12 wherein said polyene compound is 5-alkylidine-2-norbornene.

20. A process as defined in claim 12 wherein said terpolymer is a terpolymer of ethylene, propylene, and 5-ethylidene-2-norbornene.

21. A process as defined in claim 12 wherein said alkenyl aromatic monomer is styrene and said acrylic monomer is acrylonitrile.

22. A process as defined in claim 12 wherein the weight ratio between the alkenyl aromatic monomer and acrylic monomer is 1–4 to 1.

23. A process as defined in claim 12 wherein the reaction mixture contains 4–25 parts by weight of said terpolymer for each 96–75 parts by weight alkenyl aromatic monomer and said acrylic monomer.

24. A process as defined in claim 12 wherein said solvent is a mixture of aromatic and aliphatic solvent.

25. A process as defined in claim 12 wherein the reaction is carried out at a temperature within the range of 40°–150° C.

26. A process as defined in claim 12 wherein an aliphatic solvent is added to the reaction mixture in at least one increment during the reaction.

27. A process as defined in claim 26 wherein said increment is added at a time falling within one-seventh and six-seventh of the total reaction time required to achieve at least 90 percent conversion based on said monomers.

28. A process as defined in claim 12 wherein the reaction is carried out at a temperature within the range of 70°–80° C.

* * * * *

UNITED STATES PATENT OFFICE
CERTIFICATE OF CORRECTION

Patent No. 3,671,608                     Dated June 20, 1972

Inventor(s)  Curtis L. Meredith et al.

It is certified that error appears in the above-identified patent and that said Letters Patent are hereby corrected as shown below:

Column 2, line 20, change "72:38" to --- 72:28 ---

Signed and sealed this 17th day of October 1972.

(SEAL)
Attest:

EDWARD M. FLETCHER, JR.                ROBERT GOTTSCHALK
Attesting Officer                      Commissioner of Patents